March 20, 1945.　　　A. W. RIAL　　　2,371,708
CUTTING TOOL
Filed Aug. 11, 1942　　　2 Sheets-Sheet 1

Arthur W. Rial, INVENTOR

BY Victor J. Evans & Co.
ATTORNEYS

March 20, 1945.　　　A. W. RIAL　　　2,371,708
CUTTING TOOL
Filed Aug. 11, 1942　　　2 Sheets-Sheet 2
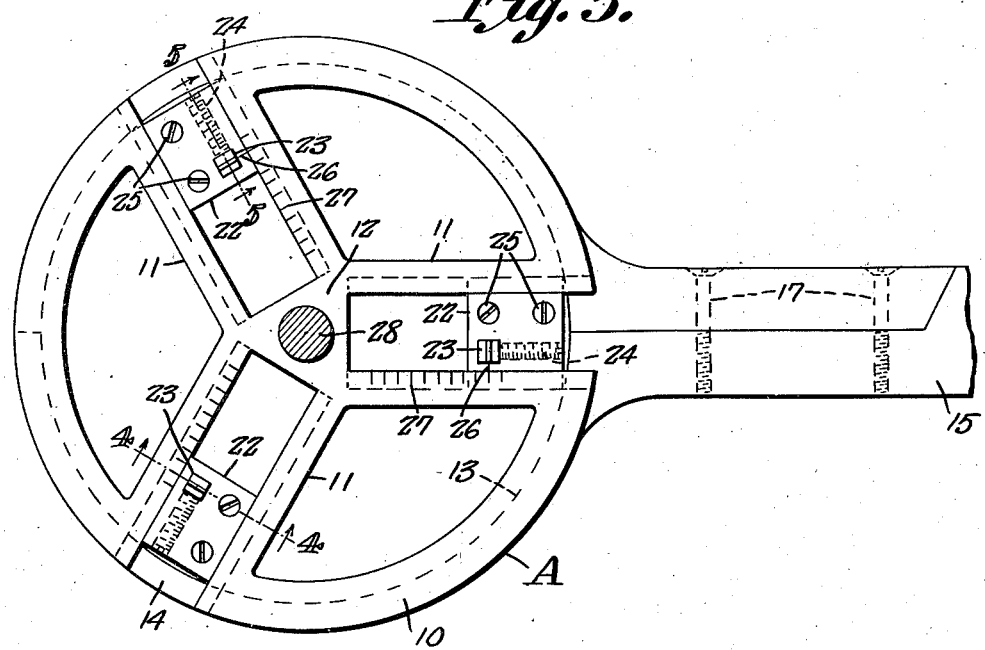
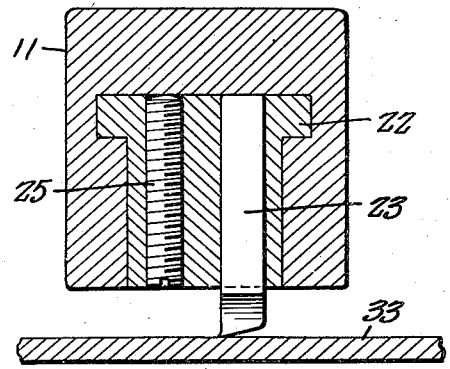
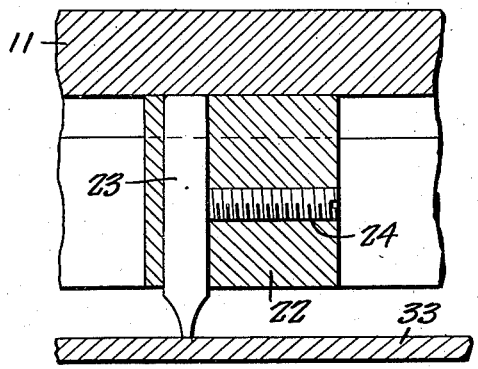
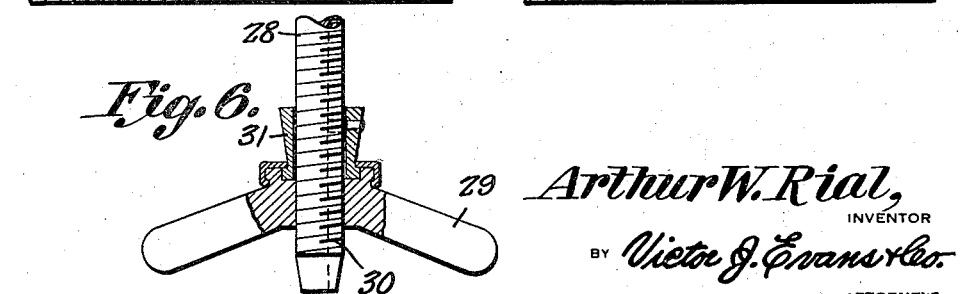
Arthur W. Rial,
INVENTOR
BY Victor J. Evans & Co.
ATTORNEYS Patented Mar. 20, 1945

2,371,708

UNITED STATES PATENT OFFICE 2,371,708

CUTTING TOOL

Arthur W. Rial, Batavia, N. Y.

Application August 11, 1942, Serial No. 454,440

3 Claims. (Cl. 77—69)

The invention relates to a cutting tool and more especially to a circular cutter.

The primary object of the invention is the provision of a tool of this character, wherein circular holes of various sizes as desired in sheet metal or other materials can be cut with dispatch and with accuracy without leaving raw edges to the hole and such tool is adapted for use by electricians, auto mechanics, sheet metal workers, boiler makers, etc., and is ratchet acting.

Another object of the invention is the provision of a tool of this character, wherein the feed of the cutters is effected by a fine threaded center stud and such cutters will remove all metal or other material leaving the hole as cut thereby of exact dimension desired, the tool being devoid of a clamping means and is susceptible of quick cutting and ratchet action.

A further object of the invention is the provision of a tool of this character, wherein the material cut is severed without a shearing action so that the edge of the hole as cut by the tool will be smooth and devoid of jibs or nibs, the tool being readily applied to the work and removed therefrom and manually actuated.

A still further object of the invention is the provision of a tool of this character, which is extremely simple in construction, thoroughly reliable and efficient in its operation, readily and easily handled, accurate and operated with dispatch, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 3 is a view similar to Figure 1 looking toward the opposite face of the tool.

Figure 4 is an enlarged vertical transverse sectional view taken on the line 4—4 of Figure 3.

Figure 5 is a sectional view on the line 5—5 of Figure 3.

Figure 6 is a fragmentary vertical sectional view showing in detail the centering stud for the tool.

Similar reference characters indicate corresponding parts throughout the several views in the drawings.

Figure 1:
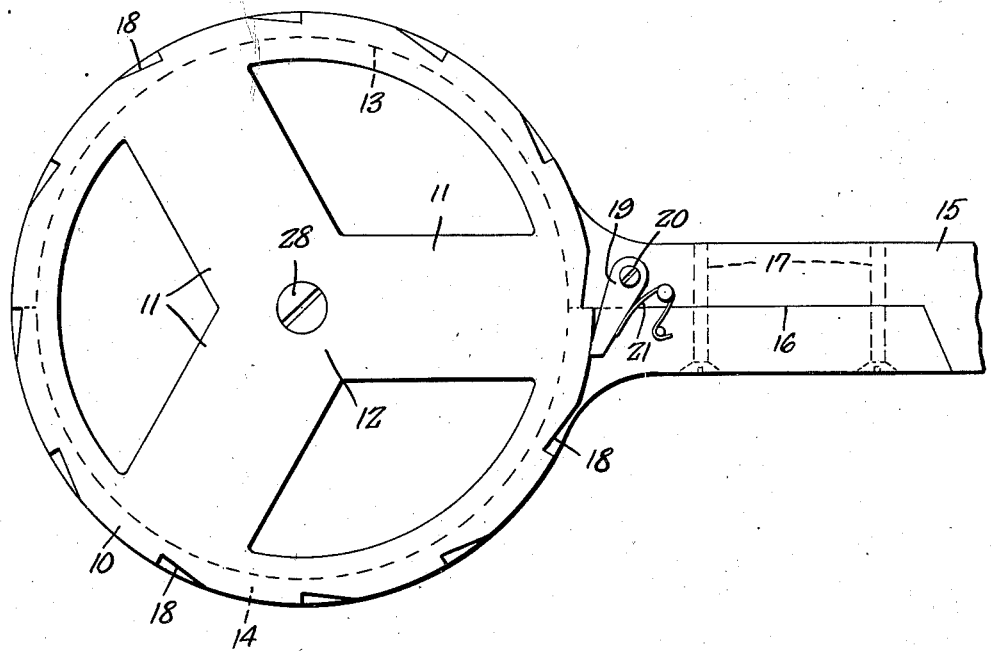
Figure 1 is a fragmentary top plan view of a tool constructed in accordance with the invention.
Figure 2:
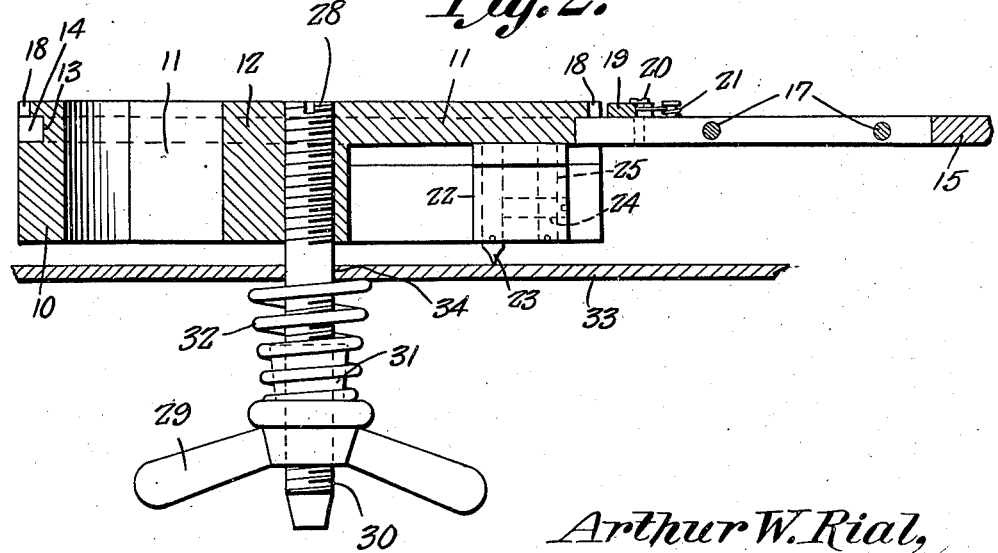
Figure 2 is a vertical longitudinal sectional view thereof showing a portion of a piece of work in position to be operated upon.

Referring to the drawings in detail, the tool comprises a circular chuck stock A formed with an annular rim 10 joined with radial spoke-like webs 11, these extending from a central hub portion 12, the rim 10 being provided externally thereof with an annular groove 13 for accommodating a circular ring 14 of a handle 15, the ring and the handle next thereto for a short distance being split as at 16 to permit the assembling of the chuck stock and the said ring, the latter being made secure for rotation upon the chuck stock by fasteners 17.

Peripherally of the stock at the rim 10 thereof are ratchet teeth 18 with which engage a ratchet dog 19 pivoted at 20 on the handle 15, the dog being held in position for ratchet action with the teeth 18 through the medium of a spring 21 so that the stock will be positively driven in one direction on reciprocating or oscillating the handle 15 in the use of the tool.

The webs 11 of the chuck stock have slidably fitted therein bit carrying blocks 22 constituting carriers therefor, the cutting bits 23 being held in working position in these blocks by binding screws 24 which are accessible at the outer ends of said blocks while the blocks 22 are adjustably fastened by binding screws 25 which are also accessible from the outer sides of the blocks. Each block carries an indicator mark 26 cooperating with a graduating scale 27 on the web 11 so that accurate adjustment of the block may be had.

Threaded in the hub portion 12 of the stock is a centering stud 28 which carries a winged nut 29 threaded thereon at 30 and this nut is swiveled with a collar 31 loosely fitting the stud 28 and having about the same a coiled helical spring 32 which is of the expansible type and is adapted at its wider end to play against a piece of work 33 having a hole 34 for accommodating the stud 28 so that the said work 33 will be automatically fed against the bits 23 for the cutting of a round hole in the work and assuring a clean cut edge to the hole without burs or nibs or irregularity therein.

In operating the tool the handle 15 under oscillation will effect ratchet action of the chuck stock positively driving the latter in one direction of rotation and the bits 23 will sever the work for the making of a circular hole therein. On adjustment of the carriers 22 for the bits 23 the size of the hole can be varied accordingly as may be desired.

What is claimed is:

1. In a cutting tool an annular body, a plurality of radial webs connecting a central hub with the body, each of said webs having a slot extending radially inward from the periphery of the body to the hub and opening through one side of the web, a block fitted in said slot and adjustable longitudinally thereof, said block having a tool receiving opening therein for holding a tool in axially projecting position on the body, means for detachably securing a tool on the block, and means for releasably locking the block in adjusted position on the web.

2. In a cutting tool, an annular body having a groove in its peripheral edge and circumferentially spaced ratchet teeth contiguous with the groove, a plurality of webs extending radially inward from the body to a central hub portion, each of said webs having a slot of T-shape cross section extending radially inward from the periphery of the body to the hub and opening through the inner face of the web, a block slidably fitted in said slot for adjustment longitudinally thereof, said block having a tool receiving opening therein for holding a tool in position to project axially of the body, means for detachably securing a tool on the block, means for releasably locking the block in adjusted position on the web, and ratchet mechanism having oscillatable connection with the groove in the body for rotating the latter.

3. On a cutting tool having an annular cutter carrying body with a central hub portion provided with a threaded opening therethrough, a depending stud disposed axially of the body and having a threaded end receivable in the opening in the hub, the opposite end of the stud being threaded, a wing nut received on said latter threaded portion and having a collar swivelly engaged therewith and loosely fitting the stud, and a coiled helical spring on the collar and engaging the work to hold the cutters of the body against the work.

ARTHUR W. RIAL.